United States Patent
Fjeldstad et al.

(10) Patent No.: US 6,628,399 B1
(45) Date of Patent: Sep. 30, 2003

(54) METHOD AND DEVICE REAL TIME NON-DESTRUCTIVE DETERMINATION OF RESIDUAL STRESSES IN OBJECTS BY THE OPTICAL HOLOGRAPHIC INTERFEROMETRY TECHNIQUE

(75) Inventors: John Petter Fjeldstad, Sandefjord (NO); Irina Evgenievna Fjeldstad, Sandefjord (NO); Leonid Mikhailovich Lobanov, Kiev (UA); Vjacheslav Avtonomovich Pivtorak, Kiev (UA); Nikolay Georgievich Kuvshinsky, Kiev (UA); Sergey Gavrilovich Andrushchenko, Kiev (UA); Vladimir Petrovich Kushniruk, Kiev (UA); Valeriy Aleksandrovich Pavlov, Kiev (UA); Vladimir Petrovich Loginov, Kiev (UA); Peter Dmitrievich Krotenko, Kiev (UA)

(73) Assignee: HoloTech a.s., Sandefjord (NO)

( * ) Notice: Subject to any disclaimer, the term of this patent is extended or adjusted under 35 U.S.C. 154(b) by 386 days.

(21) Appl. No.: 09/586,778

(22) Filed: Jun. 5, 2000

(30) Foreign Application Priority Data

Oct. 29, 1999 (NO) .......................................... 19995312

(51) Int. Cl.[7] .................................................. G01B 9/02
(52) U.S. Cl. ...................................... 356/458; 356/35.5
(58) Field of Search ................................ 356/458, 457, 356/35.5

(56) References Cited

U.S. PATENT DOCUMENTS

| 4,249,423 A | 2/1981 | Viertl et al. |
| 5,257,088 A | * 10/1993 | Tyson, II et al. ............ 244/125 |
| 5,339,152 A | * 8/1994 | Horn ............................ 356/458 |
| 5,432,595 A | 7/1995 | Pechersky |
| 5,920,017 A | 7/1999 | Pechersky |
| 6,040,900 A | 3/2000 | Chen |

FOREIGN PATENT DOCUMENTS

| SU | 1758419 | 8/1999 |
| WO | WO 9923450 | 5/1999 |

OTHER PUBLICATIONS

Journal—"Welding Engineering" 1983, vol. 12, pp. 26–28.
Dissertation abstract for Kniazkov et al., "Advanced holographic nondestructuve testing system for Residual stress analysis—Nondestructive testing and computer simulations in science and engineering," Journal: SPIE Proceedings Series, 1999, vol. 3687, pp 73–81.

* cited by examiner

Primary Examiner—Samuel A. Turner
Assistant Examiner—Michael A. Lyons
(74) Attorney, Agent, or Firm—Birch, Stewart, Kolasch & Birch, LLP

(57) ABSTRACT

This invention relates to a method and device for non-destructive testing of details, machine units and mechanisms, various materials, and in particular, to a method and device for non-destructive determination of residual stresses which are based on the optical holographic interferometry technique. First, a hologram of the investigation area of the object in its initial state is registered. Then the release of the residual stresses in an investigation point in the investigation area is performed by exposing the surface of the object to a high-current electric pulse with rectangular shape. Finally, an interferogram of the exact same area of the object is made, and the residual stresses at the investigation area are determined from the shape and size of the fringes in the interferogram.

8 Claims, 5 Drawing Sheets

1

METHOD AND DEVICE REAL TIME NON-DESTRUCTIVE DETERMINATION OF RESIDUAL STRESSES IN OBJECTS BY THE OPTICAL HOLOGRAPHIC INTERFEROMETRY TECHNIQUE

CROSS-REFERENCE TO RELATED APPLICATION

The present application claims priority under 35 U.S.C. §119 to Norwegian Patent Application No. 19995312 filed on Oct. 29, 1999, the entire contents of which are hereby incorporated by reference.

BACKGROUND OF THE INVENTION

1. Field of Invention

This invention relates to a method and device for non-destructive testing of details, machine units and mechanisms, various materials, and in particular to a method and device for non-destructive determination of residual stresses which is based on optical holographic interferometry technique.

2. Background

Optical holographic interferometry technique is well suited for non-destructive testing of internal defects in blocks and units of machines and devices, welded seams, as well as measuring stresses of an object during the object's work load and residual stresses caused by technological processes of welding, forging, soldering etc. These applications are useful for fields such as offshore oil industry, shipping industry, process industry, air industry, and all types of constructions where strength is vital or fatigue may cause a problem.

An example of the state of the art for measuring residual stresses in an object by holographic interferometry is given in the journal: "Welding Engineering" 1983, vol. 12, p. 26–28. The article describes a typical device and method for measuring residual stresses which is based on drilling a small and shallow hole in the object for release of stresses as well as holographic interferometry technique for determination of surface displacements in the object at the edge of and in the vicinity of the drilled out hole. The principle of the method can be described as follows: First, a hologram of the investigation area of the object which is it's initial state is recorded and developed on a registering medium. Next, the residual stresses in a point of the investigation area of the object is released by drilling a small hole in the object. Then the registering medium with the developed image of the investigation area in the initial state and the investigation area of the object with the drilled out hole are simultaneously illuminated by the reference and object beams respectively. The components of the residual stresses is determined from the interference pattern which occurs in the hologram.

This device and its operation stages are shown schematically in FIGS. 1–3. The means for formation and registration of holograms from an area of the object (10), as well as for formation of an interferogram from this area after release of residual stresses at the investigation point (14) of the object, is given schematically as an optical block with reference number (1) in FIGS. 1 and 3. The block contains a coherent light source (2), a holographic interferometer with optical elements (3–4) forming a reference beam (5) and an object (6) beam, and a recording medium (7). All components are rigidly connected with regard to each other. The optical block contains also a response part (8) of a precision device for fine positioning of the optical block on the object (10) above the area which is to be investigated (a corresponding receiving part (9) of the precision device is fastened on the object (10)). Means for drilling a hole at the investigation point (14) is given schematically as a mechanical block (11) in FIG. 2. Typical dimensions of the hole 1–3 mm in diameter and the depth are up to 1.5–2.0 times the diameter. In addition there are an apparatus for displaying and observation of the interferograms (in this case, a TV-camera (12) and a display screen (13)).

The operation of the device can be divided into three stages. The first stage is the registration of the hologram from the investigation area of the object; the second stage is the release of the residual stresses in the investigation point of the studied area of the object; the third stage is the formation of the interferogram from the studied object area and the determination of residual stresses in the point of the studied area. Let us consider the device operation stage by stage.

The First Stage

First, the receiving part (9) of the precision device is fixed on the investigation area of the object (10) (see FIG. 1). Then, the optical block (1) is installed above the investigation area of the object (10) by attaching the response part (8) of the precision device into the receiving part (9), and a hologram from the investigation area is registered. This is made in the following way:

The beam from the coherent light source (2) is expanded by the micro-lens (3). One part of the expanded beam is reflected by the mirror (4) towards the recording medium (7), this part is usually named the reference beam (5). The other part of the expanded beam hits the investigation area (14) of the object and reflects therefrom towards the recording medium (7). This part is named the object beam (6). When the object beam meets the reference beam, an interference occurs and a holographic image of the studied area of the object is formed. This image is registered and developed by means of the recording medium (7).

After development of the holographic image, a hologram of the studied area can be restored (i.e. the light wave scattered from the investigation area of the object is restored behind the recording medium (7)). For this purpose, it is necessary to illuminate the registering medium (7) (which contains the developed holographic image) with the reference beam (5).

The optical scheme is designated in such a manner that it has maximal sensitivity towards normal displacements of the surface of the object.

After finishing the holographic image registration of the studied area, the optical block (1) is removed from the object surface.

The Second Stage

The mechanical block (11) is installed on the studied area of the object (see FIG. 2) and, with its use, a small and shallow hole is drilled at the investigation point (14) of the object (10). The surface of the studied area is deformed in the vicinity of the hole due to release of residual stresses nearby the hole edge, and the normal component of the surface displacement at the hole edge is measured.

The Third Stage

First, the optical block (1) is extremely precisely reinstalled in the original position which it had at the first stage of the measurements (see FIG. 3) by using the precision device (8, 9). The error of positioning should be less than one wavelength. Then, the illumination of the recording medium (with the developed holographic image of the studied object area in its initial state) by the reference beam (5), and illumination of the studied area with the drilled out hole by the object beam (6) are performed simultaneously.

Thus, two light waves scattered from the investigation area of the object will simultaneously be behind the recording medium (7). One of which corresponds to the light wave scattered by studied area of the object in its initial state (before drilling the hole), and the other to the light wave scattered by the studied area of the object with the drilled out hole. As a result of the interference of these light waves, an interferogram (15) of the studied area is formed (see FIG. 3) which can be observed, for example, with a TV-camera (12) and displayed by suitable means (13). From the interferogram one can determine the normal components of the surface displacement at the hole edge. In any considered direction, for example, along the X-axis, the normal component of the surface displacement ($W_x$) at the hole edge will be equal to the number of interference fringes (N) (observed in the chosen direction), multiplied by one half of the wavelength (L) and divided by the sine of the incidence angle of the object beam (6). The residual stresses can be calculated by using the measured values of the normal component of the displacement at the hole edge. This may be performed in the following way.

In the case of a welded seam, for instance of an aluminium plate, the main residual stresses $Q_{xx}$, $Q_{yy}$ are directed in parallel and perpendicular to the welded seam, respectively, and the interference pattern consists of two pairs of mutually perpendicular lobes (15) which are schematically presented on the display screen (13) (see FIG. 3). In this case, the main stresses $Q_{xx}$ and $Q_{yy}$ are determined from simplified theoretical expressions (1) and (2) by using experimentally measured normal components of the surface displacements at the hole edge, $W_x$ and $W_y$, and assuming that the depth of the drilled out hole ($h_s$) is less or equal to its radius ($r_3$):

$$Q_x = \frac{W_x}{W_{1x}}[r_1/r_s]\{E/E_{AL}\} \quad (1)$$

$$Q_y = \frac{W_y}{W_{2x}}[r_1/r_s]\{E/E_{AL}\} \quad (2)$$

where $W_{1x}$, $W_{2x}$ are parameters equal to the normal components of the surface displacement at the hole edge along the X-axis for unity values of stresses applied first in the X-axis direction (when determining $W_{1x}$) and, then in the Y-axis direction (when determining $W_{2x}$), and which is obtained from the theoretical dependencies of $W_{2x}$, $W_{1x}$ on the ratio between $r_s$ and $h_s$ under unity stress for the studied material. E and $E_{AL}$ are elasticity modules of the studied material and aluminium, respectively.

However, the above mentioned method and equipment for determining residual stresses have essential drawbacks:
1) It is necessary to drill holes in the object that is to be investigated for residual stresses. Thus the method is a destructive test, and is obviously not acceptable for a variety of objects and applications.
2) It is necessary to remove the optical block with holographic interferometer from the studied area of the object before drilling out the hole, and to reinstall it with extreme precision in its original position. On one hand, this considerably increases the time consumption of measurements, thus the evaluation of residual stresses is not performed in a real-time scale. And on the other hand, this requires the use of extremely fine tuned precision devices for positioning of the optical block on the studied area of the object.

An attempt to eliminate the mentioned drawbacks was made in a device for measuring residual stress, described in U.S. Pat. No. 5,432,595 to Pechersky. The device and its operation stages are, schematically given in FIGS. 4–6. From the figures one see that the device has a similar optical block as the device described above (FIGS. 1–3), but the mechanical block is substituted with a pulse source (16) of infrared radiation (IR) and a mirror (17) to direct the IR-pulse to the chosen investigation point on the object.

The operation of the device also consists of three stages, namely the registration of a hologram from the investigation area of the object (see FIG. 4), followed by the release of residual stress in the investigation point (see FIG. 5), and finally a formation of the interferogram from the studied area (FIG. 6). In this case the release of the residual stresses is achieved by heating the investigation point by radiating it with the IR-pulse until it reaches the temperature of material transition into the plastic state. In contrast to the above mentioned method, this eliminates the need for removing the holographic block (1) between the registering of the holograms at stage one and three, and consequently obtains an interferogram of the investigation area practically instantaneously after performing the IR-irradiation of the investigation point, i.e. in real-time scale.

However, this device and method also suffer from considerable drawbacks which can be summarised as follows:
1) Deviation of the energy distribution over the area of the IR-pulse from a rectangular shape as well as the heat dissipation from the investigation point of the object irradiated with the IR-pulse results in a blurring out of the boundaries of the spot where the release of residual stresses occurs. This excludes the use of expressions (1) and (2) for quantitative evaluation of residual stresses from the results on measurement of normal components of surface displacement. It also makes it problematic to obtain analytical expressions for subsequent quantitative determination of residual stress from the measurement of normal components of surface displacement, and makes the assignment of determined residual stress to particular point of the object difficult.
2) Due to the heating of the investigation point up to its transition temperature to the plastic state where the residual stresses are released, the action of residual stresses localised outside of the heated spot will deform the surface of the object not only in the vicinity of the heated spot but also within the spot itself. This is an additional confirmation for the above given conclusion that this device does not allow the use of the analytical expressions given in equations (1) and (2), since these assumes that the stress release occurs in a spot with sharp boundaries and no deformation within the region with released stresses. Further, the problem of obtaining new analytical expressions for quantitative determination of residual stresses is very complicated due to uncertainty in the determination of the boundaries of the region of stress release, the transition of the material into the plastic state in the region of stress release, and the deformation of the region of stress release. This allows one to assume that the considered device can only be used, at best, to reveal residual stresses.
3) Structural changes in the irradiated spot occurs during heating up to the transition temperature by the IR-pulse create new stresses. These new stresses together with residual stresses localised outside the region of residual stress release, should deform the irradiated region and its surroundings as well. Therefore it becomes impossible, from the distribution of normal displacement components outside the irradiated spot, not only to quantitatively determine the residual stresses, but even to determine the directions of the main residual stresses. For example, in the case of a welded seam and the previously described device for determining residual stresses, the directions of the lobes of the interference pattern (15) (see FIG. 3) correspond to directions of main residual stresses. In the present device, the interference pattern (around the region of residual stress release of the welded seam) is very complicated and differs completely from that presented in FIG. 3, thus making it practically impossible to determine the directions of the main residual stresses.

BRIEF SUMMARY OF THE INVENTION

Object of Invention

The main object of the invention is to provide a device and method for performing non-destructive real-time determinations of residual stresses in materials by holographic interferometry which overcomes the above mentioned drawbacks.

It is also an object of the invention to provide a device and method for performing non-destructive real-time determinations of residual stresses in materials by holographic interferometry which is able to release the residual stresses in a region with a sharp boundary of the object.

It is also an object of the invention to provide a device and method for performing non-destructive real-time determinations of residual stresses in materials by holographic interferometry which makes it possible to employ the simple expressions given in equations (1) and (2) to calculate the residual stresses.

BRIEF DESCRIPTION OF THE INVENTION

The objectives of the invention can be achieved by the device and method disclosed in the appended claims and in the description given below.

The objectives of the invention can be achieved by exposing a certain region (the investigation point) of the investigation area of the object to a "dislocation" release of the residual stresses. A preferred way to obtain this is by exposing the investigation point of the object to an electric high-current pulse since this enables a very fast release of the residual stresses and eliminates the need to move the optical block. During exposure to an electric pulse, an energy transfer from directionally travelling electrons to the dislocations occurs, and this phenomena as well as the magneto-dynamical effect of the percussion compression of the investigation area (in which the electron stream is passing) leads to the directional movement of dislocations and to release of residual stresses. The release of residual stresses is thus carried out without causing a transition of the material into a plastic state, and it can be done in a region with a sharp boundary. Thus, if one employs an optical block which may be similar to the optical blocks described in the prior art, but which also includes a device for release of residual stresses by delivering an electric pulse at investigation point of the surface of the object, the drawbacks of the above described devices and methods is avoided. It will also be possible to use the world-widely collected experience in calculating the residual stresses by using the analytical expressions given in equations (1) and (2), as well as results on experimental determination of normal components of the surface displacement at the boundary of the region of stress release.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 4 shows stage one, FIG. 5 stage two, and FIG. 6 stage three of the determination process.

FIG. 10 shows an example of a resulting interferogram of a welded joint of plane aluminium plates where a non-destructive release of residual stresses has been performed according to this invention.

DETAILED DESCRIPTION OF THE INVENTION

Figure 1:
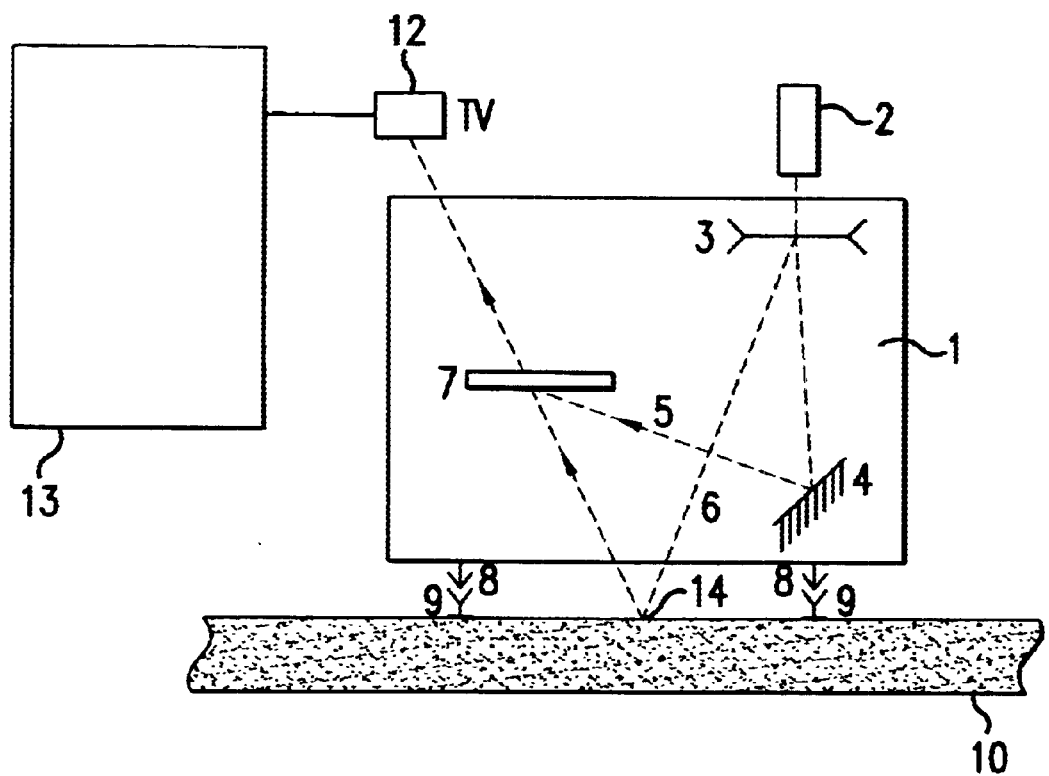
FIG. 1 shows an optical scheme and block-diagram of a device for performing determinations of residual tensions in objects by the optical holographic interferometry technique according to state of the art. The figure shows stage one of the determination process, recording of a holographic image of the investigation area of the object in its initial state.
Figure 2:
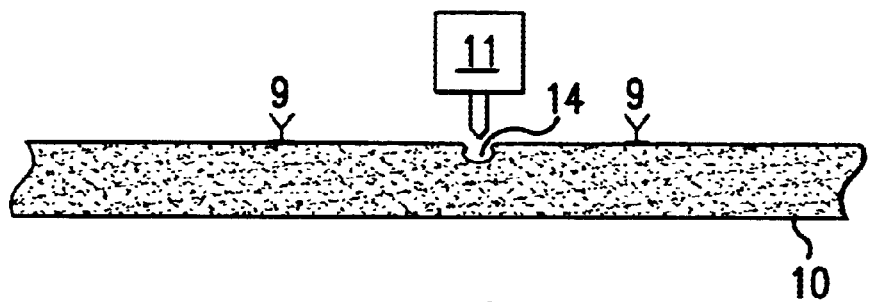
FIG. 2 shows a block-diagram of the mechanical block of a device for performing determinations of residual tensions in objects by the optical holographic interferometry technique according to state of the art. The figure shows stage two of the determination process, drilling a hole at the investigation point of the object in order to release the residual stresses.
Figure 3:
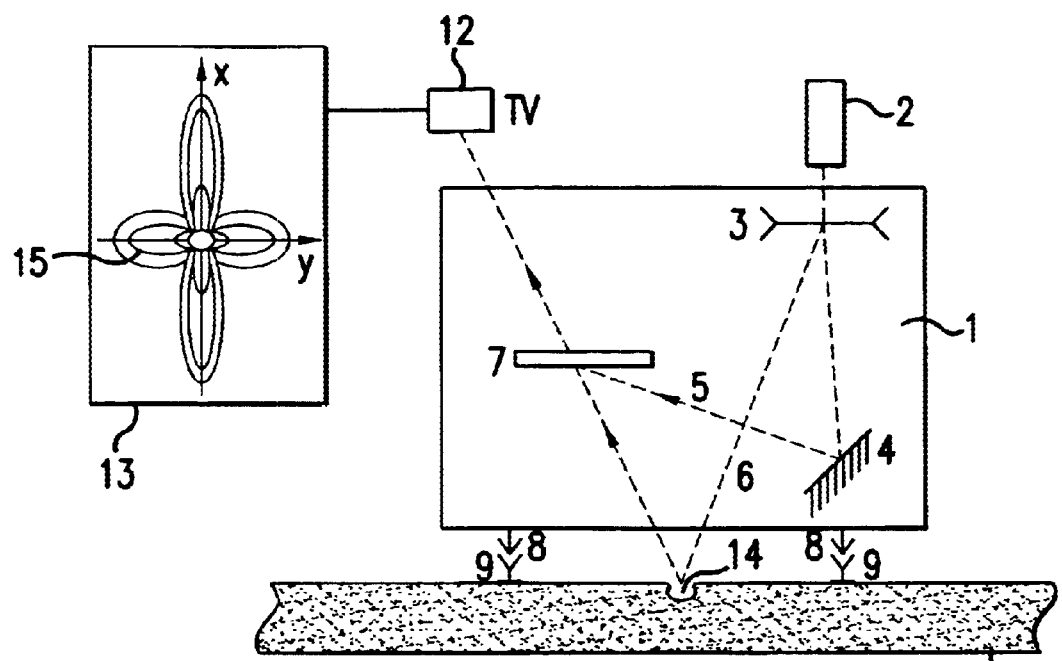
FIG. 3 shows an optical scheme and block-diagram of a device for performing determinations of residual tensions in objects by the optical holographic interferometry technique according to state of the art. The figure shows stage three of the determination process, obtaining an interferogram of the investigation area of the object.
Figure 4:
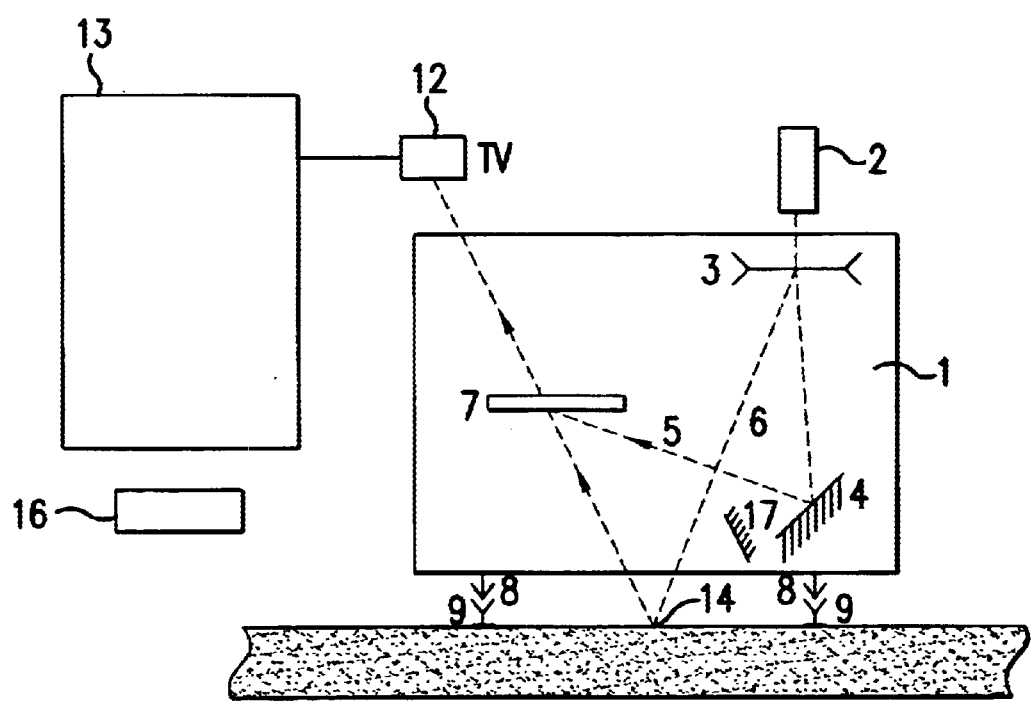
FIGS. 4–6 show an optical scheme and block-diagram of a device for performing determinations of residual tensions in objects by the optical holographic interferometry technique according to U.S. Pat. No. 5,432,595.
Figure 5:
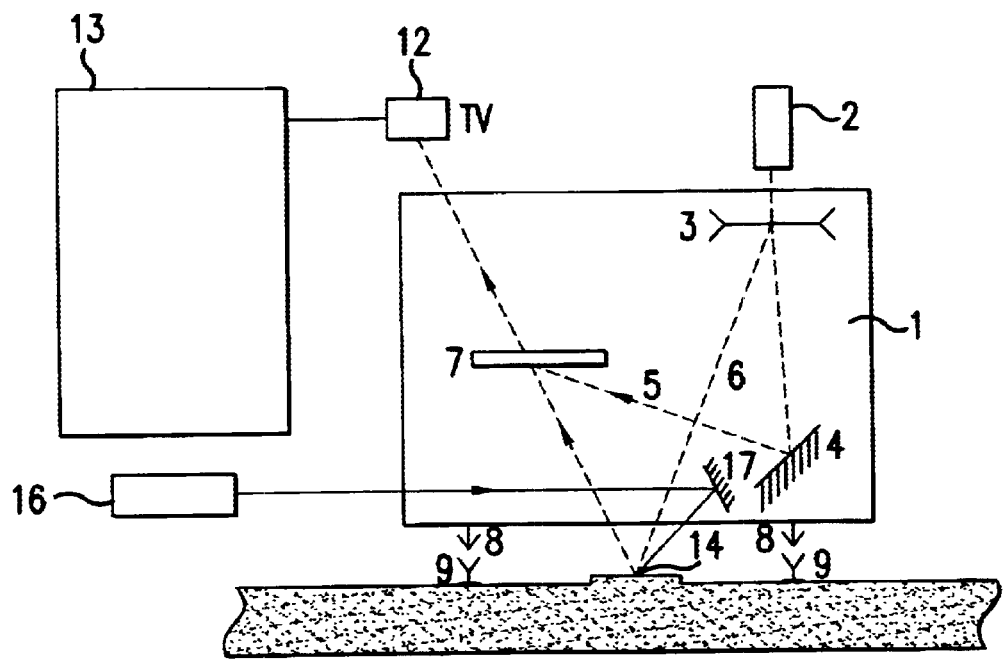
Figure 6:
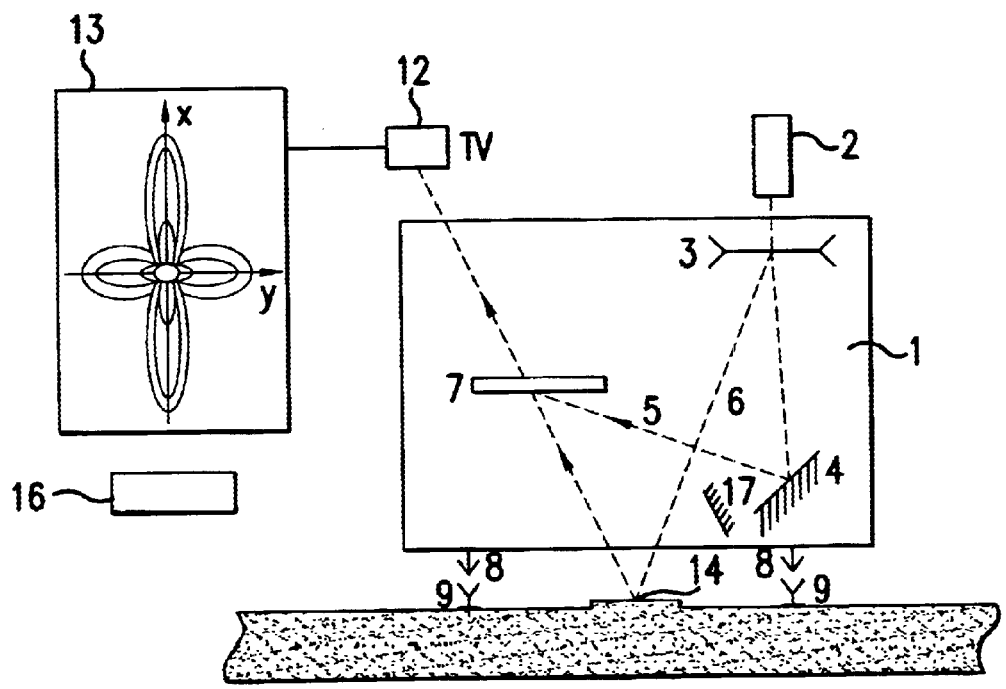
Figure 7:
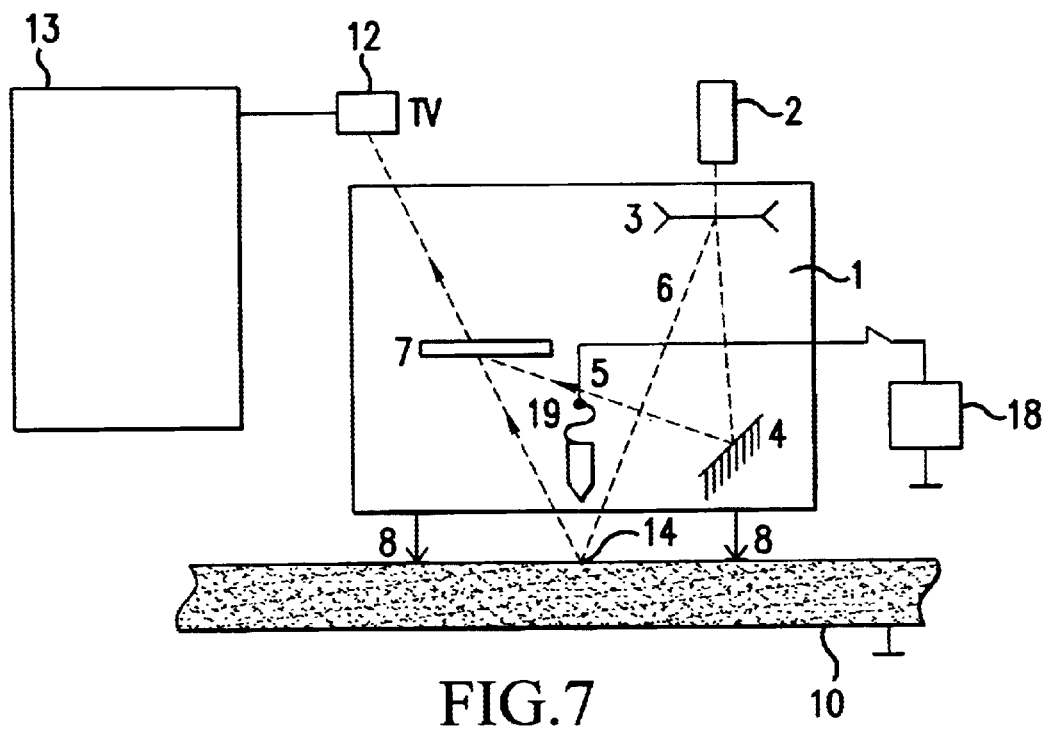
FIG. 7 shows an optical scheme and block-diagram of a device for performing non-destructive determinations of residual tensions in objects by the optical holographic interferometry technique according to this invention. The figure shows stage one of the determination process, recording of a reference holographic image of the investigation area of the object.
Figure 8:
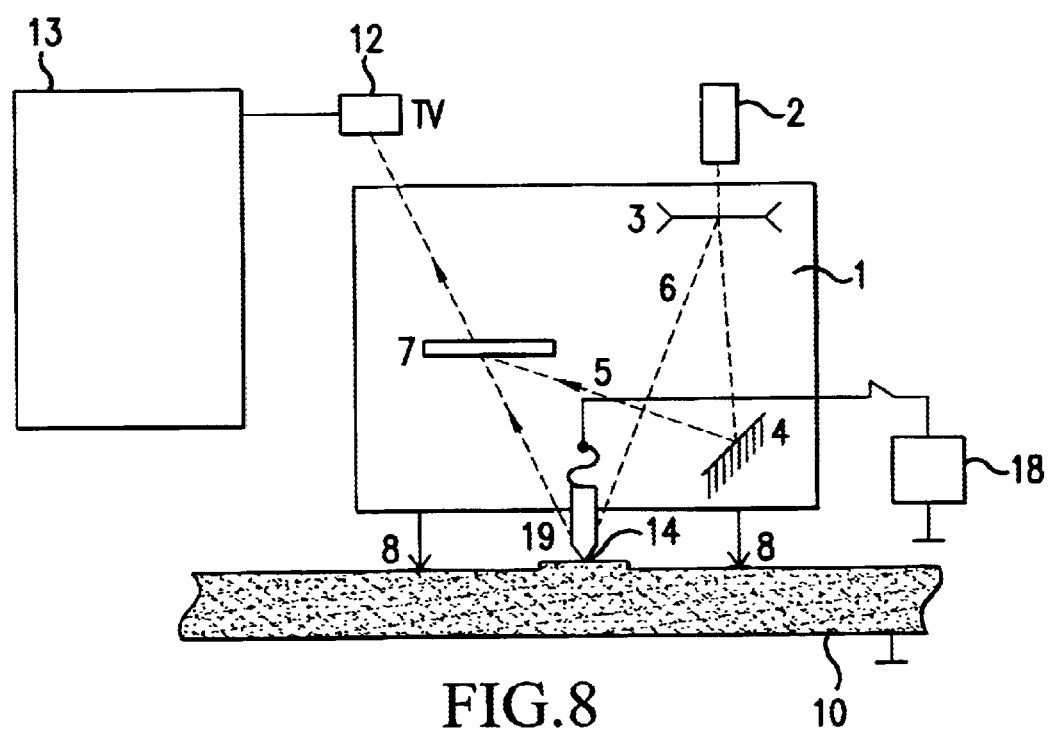
FIG. 8 shows an optical scheme and block-diagram of a device for performing non-destructive determinations of residual tensions in objects by the optical holographic interferometry technique according to this invention. The figure shows stage two of the determination process, non-destructive release of residual stresses in the investigation point of the object.
Figure 9:
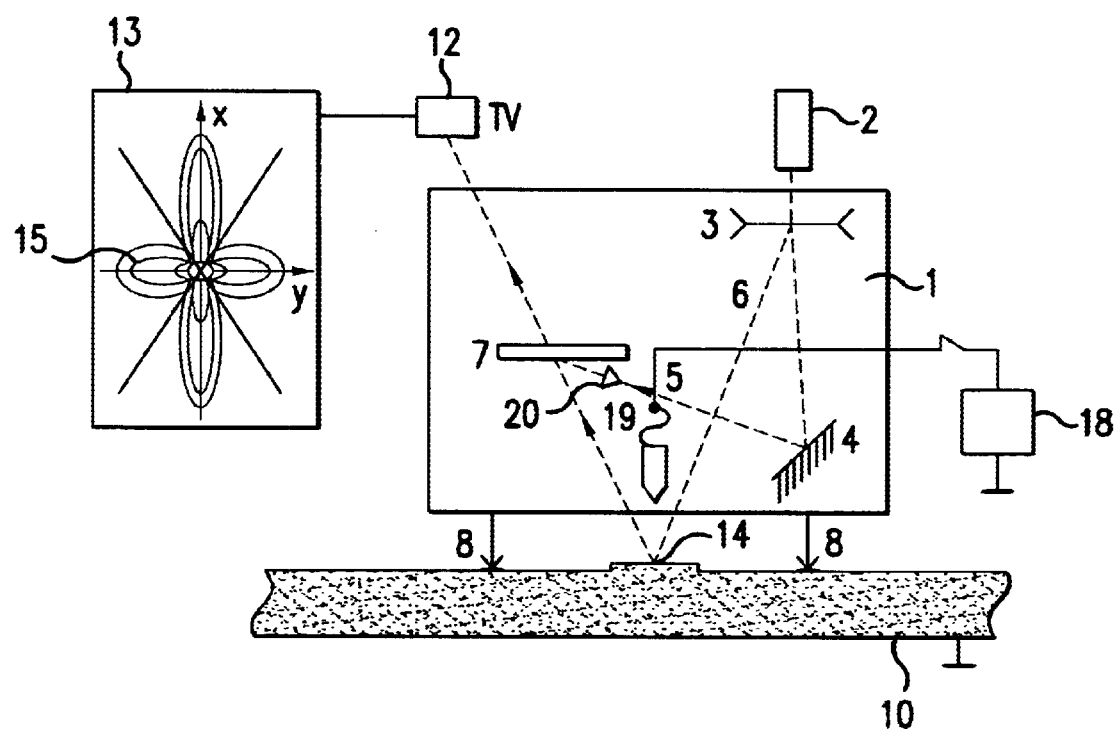
FIG. 9 shows an optical scheme and block-diagram of a device for performing non-destructive determinations of residual tensions in objects by the optical holographic interferometry technique according to this invention. The figure shows stage three of the determination process, obtaining an interferogram of the investigation area of the object.

The invention will now be described in more detail with reference to FIGS. 7–9. An optical scheme and block diagram of the claimed device is presented in FIG. 7, from which it can be seen that the device consists of an optical block (1) and an electronic block for a "dislocation" release of residual stresses. The optical block (1) is intended for formation and registration of holograms from an area of the object as well as for formation of interferograms of the above area after releasing the residual stresses. It consists of a coherent light source (2), a holographic interferometer with optical elements (3–4) for formation of a reference- (5) and object (6) beam, and a recording medium (7). All components in the optical block (1) are rigidly connected with regard to each other. The optical block also contains a device (8) for positioning and fixation on the object (10). The electronic block for "dislocation" release of residual stresses is intended for non-destructive release of residual stresses within a certain area (the investigation area) of an object. The electronic block comprises a generator (18) which is able to deliver high-current rectangular pulses (pulse parameters are within the range: amplitude 2–10 kA, duration of 0.005–0.2 seconds, and recurrence frequency 0.1–100 Hz), and an electric current supply electrode with clamping device (19) connected to the generator. The base of the electric current supply electrode is made as a half-sphere with radius 1.5–5 mm. Both the electric current supply electrode and clamping device are located structurally in the optical block (1).

The claimed method for performing the non-destructive determination of residual stresses can, as the methods of prior art, be divided into three stages; registration of a holographic image of the investigation area of the object in its initial state, release of residual stresses in a small region of the investigation area, and formation of an interferogram from the investigation area. The interferogram can be employed to determine the normal components of the displacement of the surface at the boundary of the region with released residual stresses, which in turn can be employed to calculate the released residual stresses.

The first stage (see FIG. 7) is in many ways similar to the first stage of the methods according to the prior art given above, and will thus not be described further here. All we need to know is that a holographic image of the investigation area of the object before release of the residual stresses is stored in the recording medium (7) and that the optical block (1) comprises an electric current supply electrode (19) with clamping device raised in its upper position.

The second state is the release of residual stresses. In this stage (see FIG. 8), the electric current supply electrode (19) with clamping device is lowered until junction between the investigation point of the object and electrode is established. Then a pulse of electric current is sent through this junction in order to release the residual stresses in a small region (0.5–1 mm) at the investigation point. After that, the current-supply electrode with clamping device (19) is raised to its upper position.

In the third stage (see FIG. 9), an interferogram from the investigation area of the object is formed by simultaneous illumination of the recording medium (containing the developed holographic image of the investigation area of the object in its initial state) with the reference beam (5) and of the investigation area of the object (after release of the residual stresses) with the object beam (6). Thus, there will simultaneously be two light waves behind the recording medium (7). One of which corresponds to the light wave scattered by the investigation area of the object prior to release of residual stresses, and the other corresponds to the light wave scattered by the investigation area after release of residual stresses. An interferogram of the investigation area of the object is formed as a result of the interference between these two light waves. The interferogram may be recorded by for example a TVcamera (12) and sent to a display (13) for investigation.

As an example, FIG. 10 shows a photograph of an interferogram of a studied area of a welded joint between two plane aluminium plates which contains released residual stresses. The interferogram is employed to determine the normal components of the displacement of the surface at the boundary of the region with released residual stresses. In a selected direction, the normal component of displacement of the surface at the boundary of the region with released residual stresses is equal to the number of interference fringes (observed in the chosen direction) multiplied by one-half of the wavelength and divided by the sine of the incidence angle of the object beam (6). The residual stresses can be calculated by using the above normal components and analytical expressions given in equations (1) and (2).

After achieving the interferogram, the device can also be employed to determine the sign of the normal component of the surface displacement at the edge of the region with released residual stresses by gradually introduce the optical wedge (20) into the pathway of the reference beam (5), thus increasing the optical length of the reference beam (5). If, as this takes place, the number of interference fringes in the interferogram increases in a chosen direction, then this corresponds to a negative sign of the normal component of the surface displacement (the surface displacement corresponds to a cavity). Accordingly, if the number of interference fringes decreases, then this corresponds to a positive sign of the normal component of the surface displacement (surface displacement corresponds to a convexity).

It should be noted that it is practically impossible to distinguish the end of the second stage from the beginning of the third stage which starts immediately after raising the current supply electrode to its upper position. Also the development of the holographic image in the recording medium in the first stage is very fast, in the order of 5 milliseconds or less (see Applicants' corresponding Norwegian application no. 19995273). Thus a total time consumption for determining residual stresses of about 0,1s has been obtained (not including fastening of the optical block to the object), which is so fast that one may consider it as a real-time measurement. Thus, the device and method according to this invention is also able to perform real-time monitoring of residual stresses in solid objects during their work load.

EXAMPLE

The residual stresses in a welded seam between flat aluminium plates were measured. A helium-neon laser (output power 5 mW) provided a coherent light beam, and it was employed a recording medium based on an amorphous molecular semiconductor AMS-film which is described in the Applicants' Norwegian application no. 19995273. The AMS-film was made up of 92 wt % of a co-polymer comprising epoxypropylcarbazole and 5 wt % buthylglycedil ether doped with 5 wt % of 9-(4-dodecyl-oxyphenyl-1,3-selenathiol-2-ylidene)-2,5,7-trinitrofluorene-4-carboxylate and 3 wt % of hexadecyl-2,7-dinitro-dicyanomethylenfluorene-4-carboxylate.

After registration and development of the hologram of the investigation area of the welded seam, the release of residual stresses was performed. For this aim, a pulse of electric current with a duration of 0.15 seconds and 2 kA amplitude was passed through the junction of the current supply electrode with the investigation area of the object.

A picture of the interferogram from the studied area of a welded joint containing a region of released stresses is presented in FIG. 10. As can be seen, the interferogram contains two pairs of mutually perpendicular lobes indicating directions of the main stresses along (X-axis) and across the welded seam (Y-axis). There is a fringe-free spot of 1.4 mm diameter in the centre of the interference pattern, which corresponds to the region with released residual stresses. Normal components of the surface displacements on the boundary of the region with released residual stresses were determined in its crossing points with X- and Y-axes using the interference pattern presented in FIG. 10. The main residual stresses were calculated by the analytical expressions (1) and (2), which gave $Q_{xx}$=−10,572, $Q_{yy}$=2,241 kP/mm$^2$.

These results were checked with measurements on the same weld by traditional techniques. These gave an interference pattern which was similar to that presented in FIG. 10. The directions of the main stresses determined from the newly obtained interference pattern coincided well with that presented in FIG. 10, and measured main residual stresses differed only by 20%. The statistics led to the same results. Under repeated measurements of residual stresses in welded seams of flat aluminium plates by means of the claimed device and with prior art, the average difference between measured residual stresses was the same, 20%.

Although this invention has been described in terms of an example and by a schematically presentation in "blocks", one should understand that the main scope of this invention is a general idea to employ an electric pulse in order to achieve a non-destructive release of residual stresses in an area with sharp boundaries of an object in such a manner that the need for removing and replacing the optical block is eliminated. There are of course numerous ways of supplying and retrieving an electrode to the investigation point, and there are also several ways of arranging the different components in the optical block. There may also be several other ways to supply an electric pulse with the described parameters to the surface of the investigation area of the object. These alternatives are obvious for a skilled person in the art, and should therefore be considered as included in the main scope of this invention.

What is claimed is:

1. A method for determination of residual stresses in an investigation area of an object by optical holographic interferometry comprising:

registering a hologram of an investigation area of the object in its initial state, releasing of the residual stresses in a small region of the investigation area, and forming an interferogram of the investigation area, determining normal components of a surface displacement in a point adjacent to the region with released residual stresses; and employing theoretical expressions $$Q_x = \frac{W_x}{W_{1x}}[r_1/r_s]\{E/E_{AL}\} \text{ and } Q_y = \frac{W_y}{W_{2x}}[r_1/r_s]\{E/E_{AL}\}$$

to calculate the residual stresses, wherein the release of the residual stresses is performed by exposing the small region of the investigation area of the object to an electric current pulse, wherein ($Q_x$) is a stress along an X-axis direction, ($Q_y$) is a stress along a Y-axis direction, ($W_x$, $W_y$) are the normal components of the surface displacements in the point adjacent to the region with said released residual stresses, a depth (hs) of the investigation area is less or equal to a radius ($r_s$) of the investigation area, ($W_{1x}$, $W_{2x}$) are parameters equal to the normal components of the surface displacement at the investigation area along the X-axis direction for unity values of stresses applied first in the X-axis direction, and then in the Y-axis direction, and which are obtained from the theoretical dependencies of ($W_{2x}$, $W_{1x}$) on a ratio between ($r_s$) and ($h_s$) under said unity stress for a material being investigated, and (E) and ($E_{AL}$) are elasticity modules of the material being investigated and aluminum, respectively.

2. The method according to claim 1, wherein the electric current pulse has a rectangular shape and has pulse parameters with ranges of: pulse amplitude: 1.5–20 kA; pulse duration: $10^{-6}$–$2*10^{-1}$ seconds; and recurrence frequency: 0–100 Hz.

3. The method according to claim 2, wherein when the object to be investigated is aluminum, the electric current pulse has an amplitude of approximately 2 kA and a duration of approximately 0.15 seconds.

4. A device for performing measurements of residual stresses in an investigation area of an object by use of optical holographic interferometry comprising:

an optical block which comprises a source of coherent light, a holographic interferometer and a registering medium, means for release of residual stresses in a small region of the investigation area of the object, and means for fixing the optical block to object, wherein the means for release of residual stresses is a device which is integrated in the optical block and which is moveable between an upper position and a lower position where it may establish electrical contact with the investigation area of the object in order to deliver a current electric pulse to the object at a small region of the investigation area.

5. The device according to claim 4, wherein a part of the electric current supply device which is in contact with the investigation area of the object has a half-spherical shape with a radius within a range of 1.5–5 mm.

6. The device according to claim 5, wherein the means for release of residual stresses comprises:

a generator of current rectangular pulses, and an electric current supply electrode with a clamping device which is electrically connected to the generator, for passing of an electric current rectangular pulse through a junction between the supply electrode and a surface at the investigation area of the object for a release of residual stresses.

7. The device according to claim 6, wherein the electric current supply electrode connected with the generator is able to provide the electric current pulse with rectangular shape to the investigation area of the object with parameters with ranges of: pulse amplitude: 1.5–20 kA; pulse duration: $10^{-6}31\ 2*10^{-1}$ seconds; and recurrence frequency: 0–100 Hz.

8. The device according to claim 5, further comprising:

means for introducing an optical wedge into a reference beam pathway for determining a sign of a normal component of a surface displacement.

* * * * *